(12) United States Patent
Tayloe et al.

(10) Patent No.: US 8,054,808 B2
(45) Date of Patent: Nov. 8, 2011

(54) CONTROLLING INTERFERENCE IN A WIRELESS COMMUNICATION SYSTEM

(75) Inventors: Daniel R. Tayloe, Phoenix, AZ (US); Chih-Ming J. Chiang, Chandler, AZ (US)

(73) Assignee: Motorola Mobility, Inc., Libertyville, IL (US)

(*) Notice: Subject to any disclaimer, the term of this patent is extended or adjusted under 35 U.S.C. 154(b) by 442 days.

(21) Appl. No.: 12/399,078

(22) Filed: Mar. 6, 2009

(65) Prior Publication Data

US 2010/0226340 A1    Sep. 9, 2010

(51) Int. Cl.
*H04W 4/00*    (2009.01)
(52) U.S. Cl. ............... 370/332; 370/252; 455/436
(58) Field of Classification Search ............ 370/252, 370/328, 331, 332, 338; 455/436–442
See application file for complete search history.

(56) References Cited

U.S. PATENT DOCUMENTS

| | | |
|---|---|---|
| 2007/0042784 A1 | 2/2007 | Anderson |
| 2007/0178930 A1 | 8/2007 | Xiao et al. |
| 2007/0242621 A1 | 10/2007 | Nandagopalan et al. |
| 2009/0042572 A1* | 2/2009 | Craig et al. ............ 455/436 |
| 2009/0150738 A1* | 6/2009 | Nishio et al. ............ 714/749 |

OTHER PUBLICATIONS

Lucent Technologies: "Uplink Scheduling With Inter-Cell Power Control, with Extensions to Interference Coordination", 3GPP Draft; R1-063478, 3rd Generation Partnership Project (3GPP), Mobile Competence Centre; 650, Route des Lucioles; F-06921 Sophia-Antipolis Cedex; France vol. RAN WG1, No. Riga Latvia; 20061102, Nov. 2, 2006, all pages.
ZTE: "Uplink Inter-cell Power Control based on Overload Indicator and modified IoT measurement for E-UTRA", 3GPP Draft; R1-073596 Uplink Inter-Cell Power Control Based on Over Load Indicator and Modified Iot Measurement for E-Utra, 3rd Generation Partnership project (3GPP), Mobile Competence Centre; 650, Route des Lucioles; F-06921 Sophia-Antipolis Cedex, vol. RAN WG1, No. Athens, Greece; 20070815, Aug. 15, 2007, all pages.
Mohmmad Anas et al.: "Performance Analysis of Handover Measurements and Layer 3 Filtering for Utran LTE", IEEE International Symposium on Personal, Indoor and Mobile Radio Communications, PIMRC, IEEE; PI, XX, Sep. 1, 2007, pp. 1-5.
Ericsson: "Uplink Power Control for E-UTRA", 3GPP Draft; R1-062861, 3rd Generation Partnership Project (3GPP), Mobile Competence Centre; 650, Route des Lucioles; F-06921 Sophia-Antipolis Cedex; France, vol. RAN WG1, No. Seoul, Korea, 20061004, Oct. 4, 2006, all pages.
Patent Cooperation Treaty, International Search Report and Written Opinion of the International Searching Authority for International Application No. PCT/US2010/024227, Oct. 1, 2010, 23 pages.

* cited by examiner

*Primary Examiner* — Ricky Ngo
*Assistant Examiner* — Kan Yuen

(57) ABSTRACT

A method and apparatus for controlling interference in a wireless communication system includes a first step of performing 500 a handoff measurement of a signal parameter for a current site and for nearby sites, and performing 502 a comparison of the signal parameters to select the nearby site having the strongest signal parameter. A next step 504 includes defining a target maximum allowable noise rise for the selected nearby site. A next step 506 includes calculating an upper bound for at least one operating parameter in the current site. A next step 508 includes determining whether a maximum for the at least one operating parameter exceeds 510 the upper bound. A next step 514 includes constraining the at least one operating parameter to no more than the upper bound if the maximum for the at least one operating parameter exceeds the upper bound.

5 Claims, 5 Drawing Sheets

CONTROLLING INTERFERENCE IN A WIRELESS COMMUNICATION SYSTEM

FIELD OF THE INVENTION

The present invention relates generally to Orthogonal Frequency Division Multiple Access (OFDMA) wireless communication systems, and, in particular, to interference control OFDMA communication systems.

BACKGROUND OF THE INVENTION

Orthogonal Frequency Division Multiple Access (OFDMA) communication systems have been proposed for use in Long Term Evolution (LTE) and WiMAX communication systems for transmission of data over an air interface. In OFDMA communication systems, a frequency bandwidth is split into multiple contiguous frequency sub-bands, or sub-carriers, that are transmitted simultaneously. A user may then be assigned one or more of the frequency sub-bands for an exchange of user information, thereby permitting multiple users to transmit simultaneously on the different sub-carriers. These sub-carriers are orthogonal to each other, and thus intra-cell interference is reduced.

To maximize the spectral efficiency, a frequency reuse factor of one has been proposed for both a downlink and an uplink in OFDMA communication systems. With a frequency reuse factor of one, data and control channels in one sector or cell site will likely experience interference from the same resources being un use in other sectors or cell sites. This is especially true for user equipment (UEs) at the edge or boundary of a sector or cell site or at bad coverage locations. A user located close to the cell site but near a sector boundary will not only support a very high speed, high C/I rate into the desired sector, but will also generate a very high interference noise rise into those same resources on the adjacent sector potentially rendering those adjacent sector resources unusable. On the other hand, implementation of a traditional power control scheme, wherein each UE in a sector or cell site transmits at an uplink power that results in a same received power at an enhanced NodeB for each such UE, suffers from a low overall spectral efficiency due to a lack of UEs that can transmit at high data rates.

One solution to the problem has been to treat UEs that are close-in to the cell site differently than those that are located at the edge or boundary of a sector or cell site or at bad coverage locations. Current mechanisms such as in the LTE standard use a fractional power control "alpha" parameter to generically reduce available transmit power to all close-in users based on path loss. This reduces the problem, but does not eliminate the problem. In particular, this solution may not fix high interference into adjacent sectors, but just reduce the probability of interference. In addition, this solution reduces power (and throughput) even to users not causing interference with the end result being the UE is forced to use less power than actually required and thus experiences a reduced user data throughput Therefore, a need exists for resource allocation scheme that does a better job of managing interference into adjacent sectors or cell sites than the current algorithms

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE INVENTION

The present invention provides a resource allocation scheme that minimizes interference into adjacent sectors or cell sites. Currently, in Long Term Evolution (LTE) or Fourth Generation (4G) communication systems, uplink modulation schemes allow Modulation and Coding Scheme (MCS) modes requiring up to nineteen decibels of carrier-to-interference ratio (C/I) for proper operation. When near sector or cell boundaries, this can cause high interference into adjacent sectors or cell sites. The present invention makes use of existing periodic handoff measurements to measure the Received Signal Strength Indication (RSSI) or C/I difference between the current sector or cell site and the next best sector or cell site. A target maximum allowable noise rise is defined for the other sectors or cell sites. The sum of the RSSI or C/I difference is added to the target max noise rise to set an upper bound for operating a user equipment (UE), as will be detailed below. As used herein, the term "site" can be applied equally well to either cell sites or individual sectors within a cell site.

The communication system as described herein preferably operates in accordance with the 4G or LTE standards, which standards specify wireless telecommunications system operating protocols, including radio system parameters and call processing procedures. However, those who are of ordinary skill in the art realize that communication system may operate in accordance with any wireless telecommunication system employing a frequency division multiplexing scheme or a time and frequency division multiplexing scheme, such as a 3GPP (Third Generation Partnership Project) E-UTRA (Evolutionary UMTS Terrestrial Radio Access) standard, a 3GPP2 (Third Generation Partnership Project 2) Evolution communication system such as a CDMA (Code Division Multiple Access) 2000 and 1XEV-DO communication system, a Wireless Local Area Network (WLAN) communication system as described by the IEEE (Institute of Electrical and Electronics Engineers) 802.xx standards, for example, the 802.11a/HiperLAN2, 802.11g, 802.16, or 802.21 standards, or any of multiple other proposed ultrawideband (UWB) communication systems.

Figure 1:
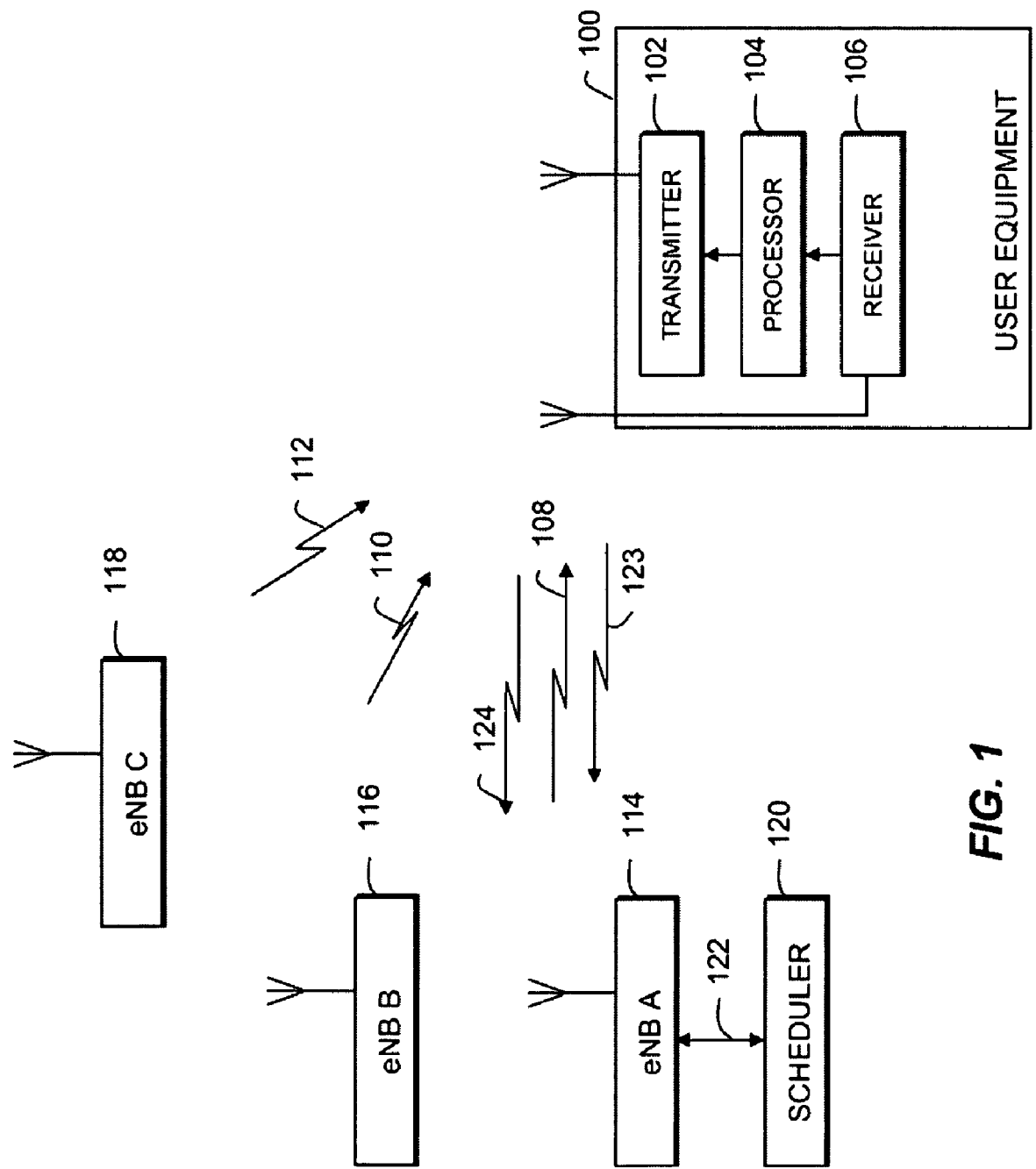
FIG. 1 is a simplified block diagram of a wireless communication system, in accordance with the present invention.
Figure 2:
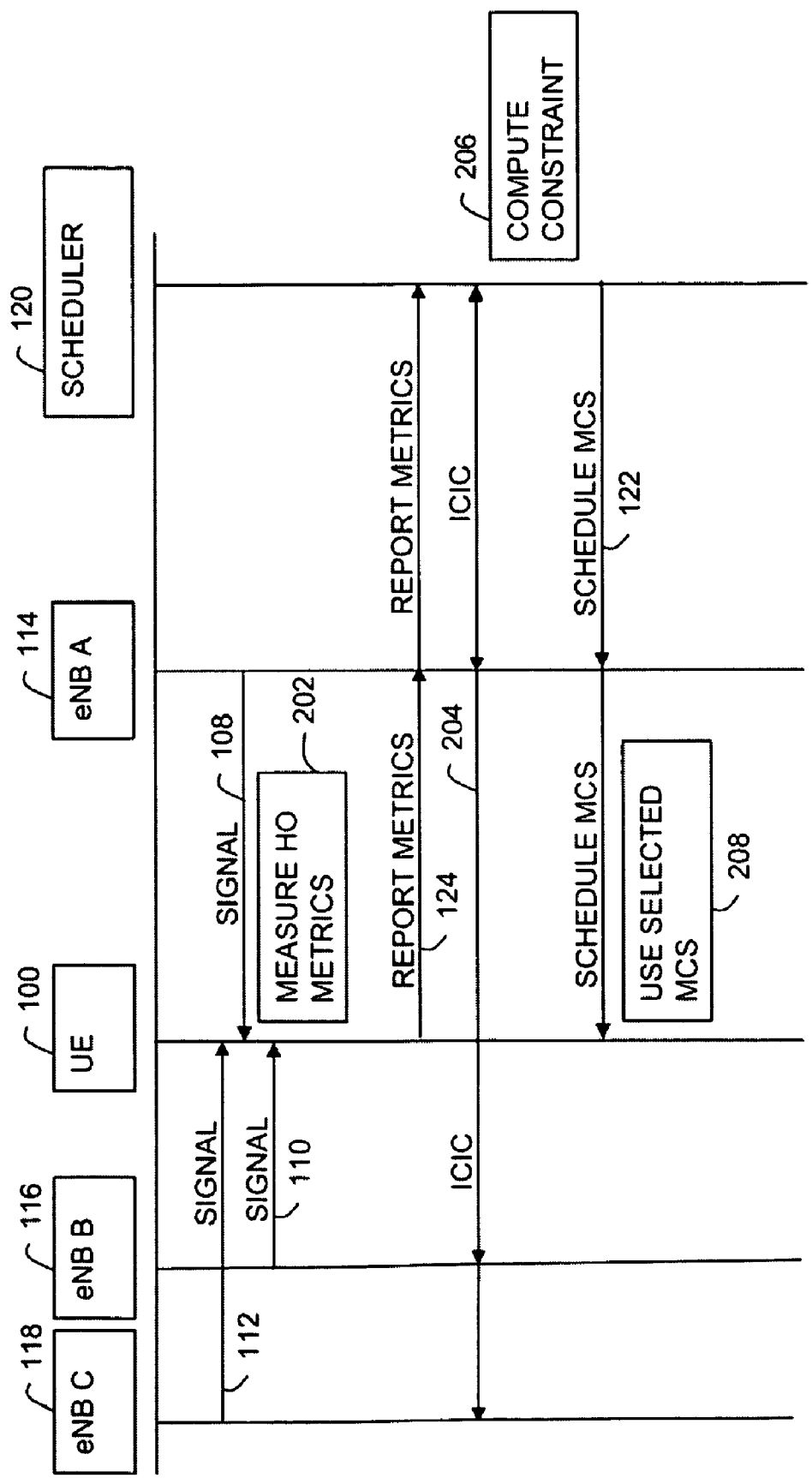
FIG. 2 is a simplified call flow diagram, in accordance with the present invention.

FIGS. 1 and 2 illustrate wireless communication system, in accordance with an embodiment of the present invention. The communication system can includes multiple user equipment (UEs) 100 (one shown), such as but not limited to a cellular telephone, a radio telephone, a personal digital assistant (PDA) with radio frequency (RF) capabilities, or a wireless modem that provides RF access to digital terminal equipment (DTE) such as a laptop computer. The communication system can further includes a radio access network (e.g. 114) that provides communication services to each UE 100 residing in a coverage area, such as a cell or a sector, of the radio access network via an air interface, e.g. 108, 123. The radio access network includes a transceiver, such as an enhanced NodeB (eNB) or a Base Transceiver Station (BTS), in wireless communication with each UE 100 and further includes a network controller, such as a Radio Network Controller (RNC), Base Station Controller (BSC), coupled to the transceiver. Air interface 110 comprises a downlink and an uplink (e.g. 108, 123). Each of the downlink and uplink comprises multiple physical communication channels, including at least one signaling channel and at least one traffic channel.

The transceiver and controller each includes a respective processor, such as one or more microprocessors, microcontrollers, digital signal processors (DSPs), combinations thereof or such other devices known to those having ordinary skill in the art. The particular operations/functions of processors, and respectively thus of the transceiver and controller, are determined by an execution of software instructions and routines that are stored in a respective at least one memory device, as are known in the art, associated with the processor, such as random access memory (RAM), dynamic random access memory (DRAM), and/or read only memory (ROM) or equivalents thereof, that store data and programs that may be executed by the corresponding processor.

UE 100 includes a processor 104, such as one or more microprocessors, microcontrollers, digital signal processors (DSPs), combinations thereof or such other devices known to those having ordinary skill in the art. The particular operations/functions of processor 104, and respectively thus of UE 100, is determined by an execution of software instructions and routines that are stored in a respective at least one memory device associated with the processor, such as random access memory (RAM), dynamic random access memory (DRAM), and/or read only memory (ROM) or equivalents thereof as are known in the art, that store data and programs that may be executed by the corresponding processor. The UE also has the processor coupled to a transmitter 102 and a receiver 106 for communicating over the air interface with the radio access network.

The UE 100 is under the control of enhanced NodeB (eNB) A. The processor 104 of the UE 100 will direct the transmitter 102 to perform periodic handoff measurements 202 of signals 108, 110, 112 from its own sector's eNB 114 and that of neighboring eNBs 116, 118. Although only two neighboring eNBs are shown in this example, there can be many more to report. The processor 104 of the UE 100 will direct the transmitter 102 to report 124 these handoff metrics (e.g. RSSI or C/I difference) to the scheduler 120 through its serving eNB 114. Optionally, the scheduler can receive a report 204 from its neighbor eNBs 116 and 118 detailing which resources the eNBs will be using via Inter-Cell Interference Communications (ICIC), for example. A processor of the scheduler 120 then computes a constraint 206 on an allowable MCS and/or uplink power limit (C/I) for the UE 100 using the measured handoff metrics, a predefined allowable noise rise in nearby sectors, and optionally the ICIC information which gives resource usage in adjacent sites. A selected MCS/power limit is then scheduled 122 for the UE 100 through the eNB 114, which the UE 100 can then use 208 for its uplink communications.

The constraint computation 206 used by the scheduler 120 includes a difference comparison between the handoff metrics of the UE's own sector eNB (presumably the strongest signal) and the next strongest signal of a nearby eNB. This difference is then added to the allowed noise rise for the nearby eNB, which defines an upper limit for uplink power for the UE which in turn limits the modulation mode and rate combination of the UE. The scheduler 120 can then schedule 122 a selected MCS for the UE that uses a C/I power level that is less than or equal to this upper limit. In this way, the UE should not generate a noise rise in the next strongest sector that exceeds the allowed noise rise when it uses 208 the selected MCS for its uplink communications in the desired sector. Optionally, the constraint computation 206 can utilize any ICIC information 204 about whether the resources in the next sector are even in use. If the targeted resources in the next sector are not in use then interference in that sector is not an issue, and the selected MCS will not be constrained. If the resource is not in use in the second strongest cell, the constraint computation 206 can optionally be made against the next strongest sector in order to continue looking for interference constraints. If the next strongest sector is also not in use, comparisons will continue to be made against all the neighbors in the handoff measurement report until either the list is exhausted, in which case there is no limitations on the UE power, or until a given comparison shows that there is or is not a power limitation on the UE.

It should be noted that in the example here, the scheduler performs that constraint computation. However, it should be recognized that the constraint computation could be performed in any network entity. More particularly, the functionality described herein as being performed by the scheduler may be implemented in a base station transceiver or controller or may be distributed among the transceiver and controller, and more particularly may be implemented with or in software programs and instructions stored in a memory device of the transceiver or controller and executed by the respective processor of the transceiver or controller. In addition, one of ordinary skill in the art realizes that the embodiments of the present invention alternatively may be implemented in hardware, for example, integrated circuits (ICs), application specific integrated circuits (ASICs), and the like, such as ASICs implemented in one or more of the transceiver and controller. Based on the present disclosure, one skilled in the art will be readily capable of producing and implementing such software and/or hardware without undo experimentation.

Figure 3:
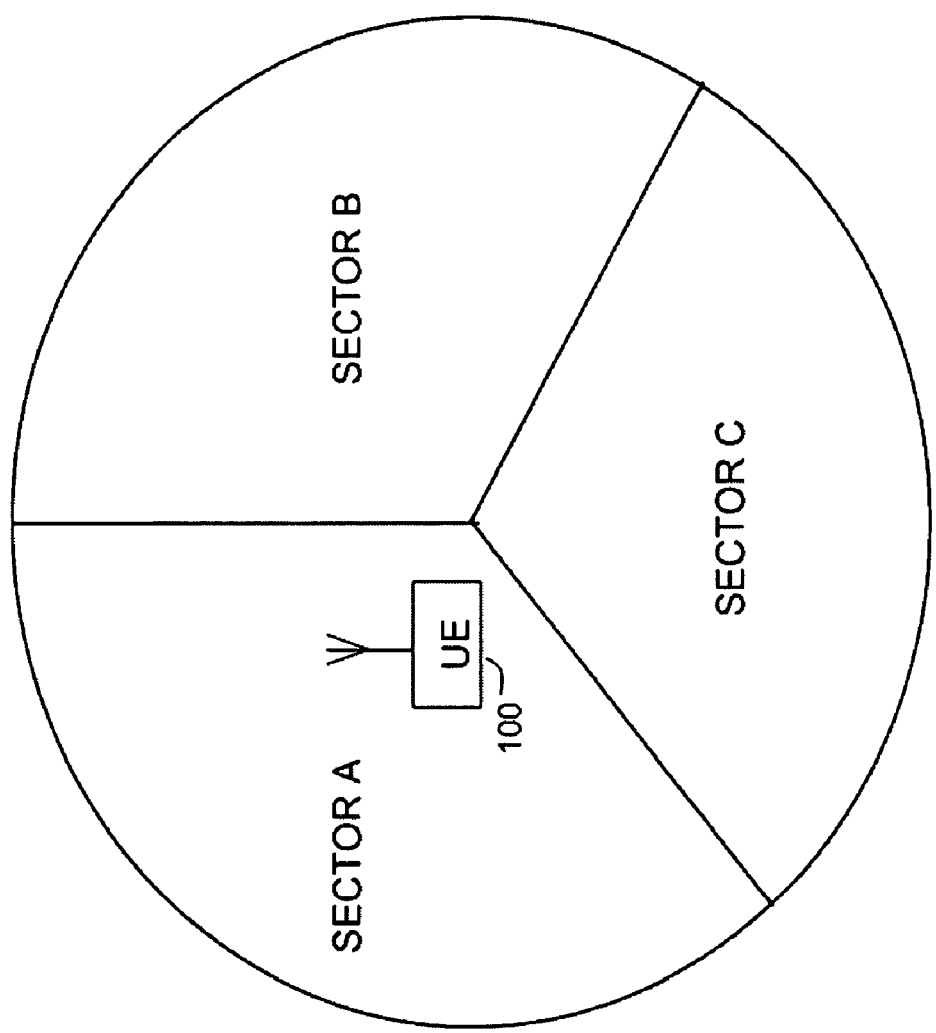
FIG. 3 is an illustration of a first UE of a wireless communication system, in accordance with the present invention.

FIG. 3 shows a first operating condition addressed by the present invention, wherein the UE 100 is located near the center of sector A, close-in to the middle of the cell site. In the 4G communication system, this UE 100 is capable of utilizing a maximum reverse (uplink) MCS rate (at 19 dB C/I) into the eNB controlling the sector (A) serving the UE. In this geographic position in sector A, the UEL 100 will perform periodic RSSI or C/I handoff measurements of its own sector and that of neighboring sites. In this example, the UE 100 measures −60 dBm, −81 dBm, and −83 dBm for sectors A, B, and C, respectively. In this case, the next strongest signal of −81 dBm comes from sector B. Doing a comparison betweens the serving sector (A) and the next best sector (B) results in a 21 dB difference (−60 dBm−(−81 dBm)=21 dB). If it is determined, for example, that no more than 5 dB of noise rise into next best sector B is acceptable, the UE can then use up to 5+21, or 26 dB, uplink C/I for its selected MCS rate before exceeding 5 dB noise rise in the next sector. Since the maximum MCS rate needs only 19 dB C/I, the UE need not be power or rate constrained. As a result, the UE 100 can use center-of-beam geometry (i.e., handoff information shows the next best sector is 21 dB down) to maintain full power and highest uplink data rates. Unlike the prior art, which would use an "alpha" parameter to blindly back off power for the UE 100, based only on knowledge of a low path loss to the eNB, without regard to whether the UE is an interferer, the present invention provides higher throughput for this case.

Figure 4:
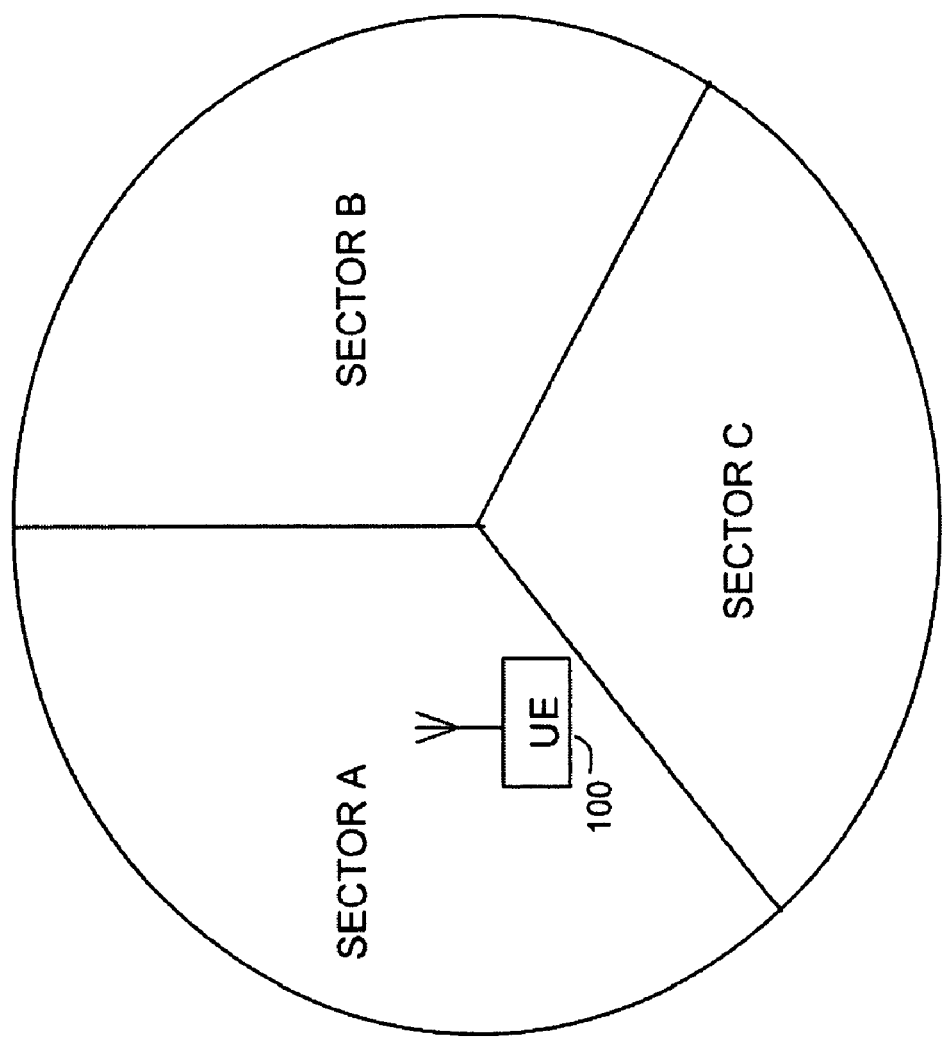
FIG. 4 is an illustration of a second UE of a wireless communication system, in accordance with the present invention.

FIG. 4 shows a second operating condition addressed by the present invention, wherein the UE 100 is now located near a sector boundary between sectors A and B, but still close-in to the cell site. As before, in the 4G communication system, this UEL 100 is capable of producing a maximum reverse (uplink) MCS rate (at 19 dB C/I) into the enhanced NodeB (eNB) controlling the sector (A) serving the UE. In this geographic position in sector A, the UEL 100 will perform periodic RSSI or C/I handoff measurements of its own sector and that of neighboring sites. In this example, the UE 100 measures −60 dBm, −83 dBm, and −63 dBm for sectors A, B, and C, respectively. In this case, the next strongest signal of −63 dBm comes from sector C. Doing a comparison betweens the serving sector (A) and the next best sector (C) results in a 3 dB difference (−60 dBm−(−63 dBm)=3 dB). Again, if it is determined, for example, that no more than 5 dB of noise rise into next best sector C is acceptable, the UE can then only use up to 5+3, or 8 dB, uplink C/I for its selected MCS rate before exceeding 5 dB noise rise in the next sector. As a result, the UE 100 is constrained to use a MCS modulation and rate format that is limited to 8 dB C/I, and can not use the maximum MCS rate that operates at 19 dB C/I. Here it should be noted that having a UE near a sector boundary has the potential of producing very high noise rise into sector C uplink resources. The prior art would use an "alpha" parameter to blindly back off power for UE, but not enough to mitigate the problem, still causing interference in sector C. In contrast, the present invention provides more accurate inference protection.

In an optional embodiment, if it were known that the resources in next sector were not in use (i.e. there are no communications in sector C to interfere with), the present invention can allow the UE 100 to use the maximum MCS rate and full power anyway. To determine whether an adjacent sector/cell is in use, existing inter-cell communication techniques could be used, such as ICIC.

It should be noted that the present invention is not limited to the close-in UE scenarios described above, but is also applicable to UEs anywhere with the sector/site. Also, although the above embodiments are drawn towards the prevention of a UE causing uplink interference in a nearby sector of cell site, the present invention also envisions an embodiment for the downlink case, wherein the present invention could be applied using UE handoff measurements and sector/site differences to predict forward link interference from other sectors to this specific UE on the forward link. In this embodiment, the present invention can predict other sector/cell forward link interference to each UE, and can reduce downlink power and modulation format (MCS) in an adjacent sector to meet the forward link maximum interference criterion as described above for the uplink case.

Figure 5:
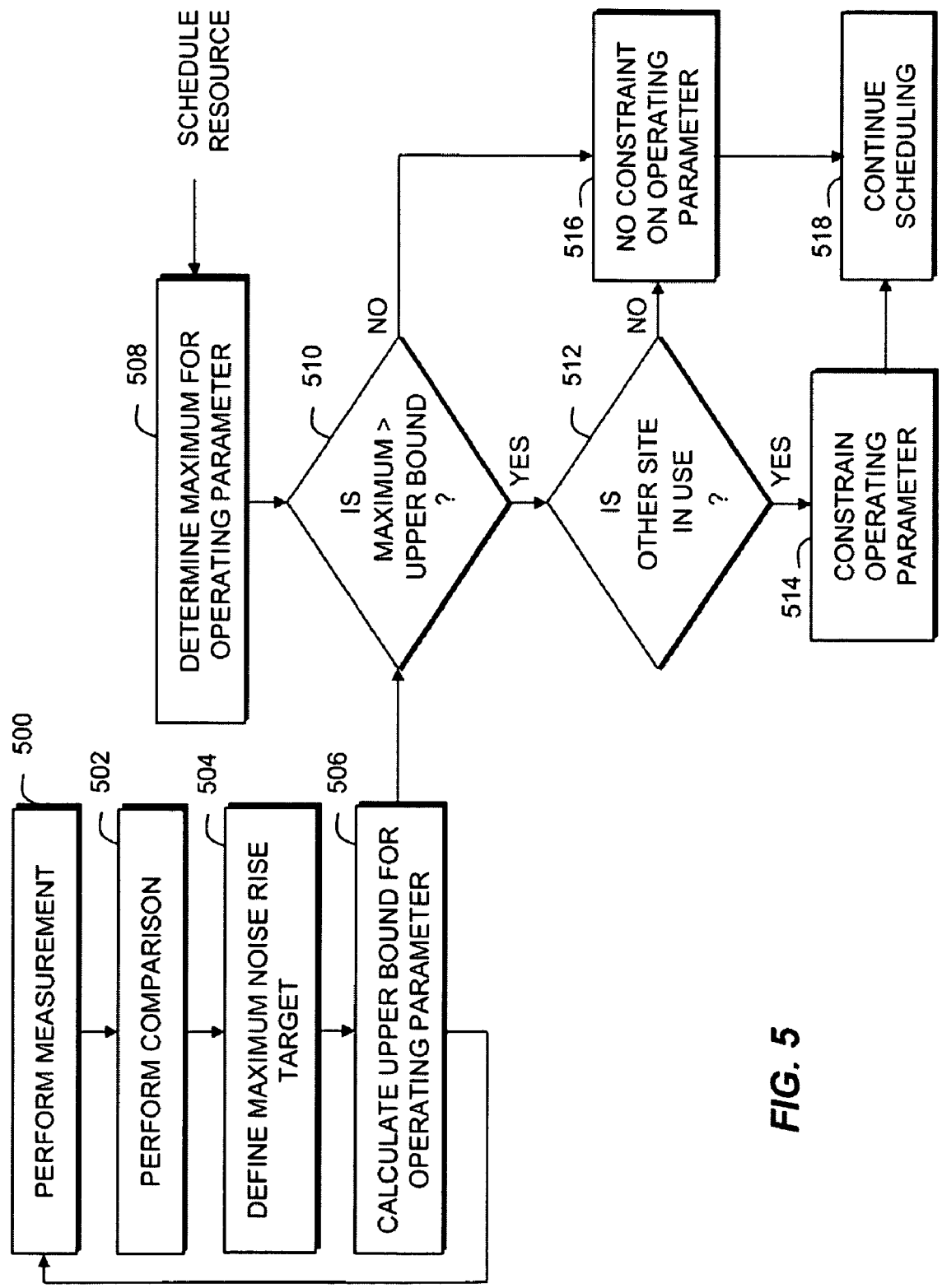
FIG. 5 illustrates a method for minimizing interference, in accordance with the present invention.

Referring to FIG. 5, another embodiment of the present invention encompasses a method 10 for controlling uplink interference in a wireless communication system. The method includes a first step 500 of performing a handoff measurement of a signal parameter for a current site and for nearby sites. Preferably, the signal parameter is a received signal strength indication (RSSI) measurement or a carrier-to-interference ratio (C/I) measurement. This step also includes a step 502 of performing a comparison of the signal parameters to select the nearby site having the strongest signal parameter relative to the current site by computing a difference between the signal parameter measurements of the current site and the selected nearby site Optionally, if the resource is not in use in the second strongest cell, the computing can be made against the next strongest sector in order to continue looking for interference constraints. If the next strongest sector is also not in use, comparisons will continue to be made against all the neighbors in the handoff measurement report until either the neighbor list is exhausted, in which case there is no limitations on the UE power, or until a given comparison shows that there is or is not a power limitation on the UE.

A next step 504 includes defining a target maximum allowable noise rise for the selected nearby site. Each site can have its own maximum noise rise target, or many sites can share the same maximum noise rise target. These targets can be defined dynamically to reflect changing channel conditions.

A next step 506 includes calculating an upper bound for at least one uplink operating parameter in the current site by summing the difference with the target maximum allowable noise rise to set the upper bound. Preferably, the at least one uplink operating parameter includes modulation and coding scheme (MCS) rate and/or an associated carrier-to-interference ratio (C/I) needed at the eNB receiver associated with the reception of that MCS. The upper bound can be recalculated periodically by repeating steps 500-506 such as when new handoff measurement reports are received Another step 508 includes determining a maximum for the at least one uplink operating parameter. This can be defined by the network when scheduling resources. For example, the 4G communication system is presently capable of utilizing a maximum reverse (uplink) MCS rate at 19 dB C/I. This step also includes a step 510 of determining whether a maximum for the at least one uplink operating parameter exceeds the upper bound. If the maximum for the at least one uplink operating parameter does not exceeds the upper bound, then there is no constraint on the at least one operating parameter, and the method then proceeds 518 with the continuation of scheduling. Otherwise, the method continues on to the next step (512 if included, or 514). This step can optionally include a step 512 of determining if the selected nearby site is in use. If it is determined that the selected nearby site is not in use, then there is no constraint on the at least one operating parameter, and the method then proceeds 518 with the continuation of scheduling. Otherwise, the method continues on to the next step 514. Optionally, if the selected nearby site is not in use the determining step can instead use the next best site to check for power constraints. This is an iterative process depending on how many sites are in the handoff measurement report. If none of the other sites have resources in use, the algorithm may exhaust the entire list and end up with no power constaints.

A next step 514 includes constraining the at least one uplink operating parameter to no more than the upper bound if the maximum for the at least one uplink operating parameter exceeds the upper bound. Optionally, if it is known if the selected nearby site is in use (from step 512), this step also includes constraining the at least one uplink operating parameter only if the selected nearby site is in use.

The method then proceeds 518 with the continuation of scheduling.

Advantageously, the measurements and calculations provided by the present invention allow for better adjacent sector interference management, and allows higher UE throughput under low interference conditions than is available under the prior art.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for controlling uplink interference in a wireless communication system, the method comprising the steps of:
    performing a handoff measurement of a signal parameter for a current site and for nearby sites, and performing a comparison of the signal parameters to select the nearby site having the strongest signal parameter relative to the current site by computing a difference between the signal parameter measurements of the current site and the selected nearby site;
    defining a target maximum allowable noise rise for the selected nearby site;
    calculating an upper bound for at least one uplink operating parameter in the current site by summing the difference with the target maximum allowable noise rise to set the upper bound;
    determining whether a maximum for the at least one uplink operating parameter exceeds the upper bound; and
    constraining the at least one uplink operating parameter to no more than the upper bound if the maximum for the at least one uplink operating parameter exceeds the upper bound.

2. The method of claim 1, wherein the determining step also includes determining if the selected nearby site is in use, and wherein the constraining step also includes constraining the at least one uplink operating parameter only if the selected nearby site is in use.

3. The method of claim 1, wherein the signal parameter is received signal strength indication (RSSI).

4. The method of claim 1, wherein the signal parameter is a carrier-to-interference ratio.

5. The method of claim 1, wherein the at least one operating parameter includes a modulation and coding scheme rate and an associated carrier-to-interference ratio.

* * * * *